May 19, 1970     J. D. GINER ET AL     3,513,029

FUEL CELL AND ELECTRODES THEREFOR

Filed Sept. 10, 1964

INVENTORS,
JOSE D. GINER
JOHN H. SIZER, JR.

BY *Watson, Cole, Grindle & Watson*
ATTORNEYS

United States Patent Office 3,513,029
Patented May 19, 1970

3,513,029
FUEL CELL AND ELECTRODES THEREFOR
Jose D. Giner, Glastonbury, and John H. Sizer, Jr., Vernon, Conn., assignors, by mesne assignments, to Leesona Corporation, Cranston, R.I., a corporation of Massachusetts
Filed Sept. 10, 1964, Ser. No. 395,441
Int. Cl. H01m 27/00
U.S. Cl. 136—86                                             11 Claims

ABSTRACT OF THE DISCLOSURE

An improved fuel cell comprising a bi-porous electrode structure in which the fine pore layer of the bi-porous structure is covered with a distinct third layer is described. In disposing of the aforesaid electrode in the fuel cell the third layer is in contact with the electrolyte of the cell.

---

Figure 1:
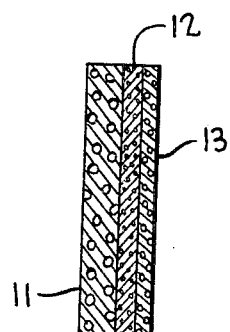

This invention relates to improved fuel cell electrodes, and more particularly, to fuel cell electrodes comprising a coarse pore layer, a fine pore layer, and a third layer in contact with the fine pore layer. In the construction of a fuel cell employing the aforesaid electrodes, the coarse pore layer is in contact with the reactant feed and the fine pore layer is in contact with the third layer. The third layer is in contact with the electrolyte. The electrodes permit an efficient control of the reaction interface of reactant feed, electrolyte and electrode. Moreover, the fine pore layer is protected by the third layer, prolonging the lifetime of the electrodes and lessening dendrite formation in the cell.

In the prior art, various electrode structures have been utilized in an effort to obtain a commercially feasible fuel cell capable of producing low voltage direct current electrical energy from a fuel and oxidant. Such cells must be constructed from relatively low cost materials and operable on conventional fuels. Moreover, the components of the cell must be highly resistant to corrosion and remain substantially invariant under the operating conditions of the cell. Thus, extensive research has been carried out in an effort to obtain electrodes which will sustain high current densities at low temperatures. The prior art electrodes have met with varying degrees of success. However, an electrode which is capable of being used as either an anode or cathode and which will perform satisfactorily in a relatively corrosive environment on conventional fuels is still the object of intense research.

In the early fuel cells, the electrodes employed were substantially homo-porous. Therefore, to regulate the interface of solid electrode, reactant, and electrolyte, it was necessary to carefully control the pore size of the electrode during the manufacture of the electrode and while operating the cell, to accurately control the pressure differential of the reactants and the surface tension of the electrolyte. As a practical matter, it was substantially impossible to obtain pores completely uniform in size. Therefore, the cell was always operated with the smaller pores of the electrodes flooded with electrolyte due to capillary action or with reactant gas bubbling through the larger pores unconsumed.

As a solution to the aforesaid problem, Francis T. Bacon introduced a bi-porous electrode structure, whereby, in a fuel cell, the large pores of the structure faced the gas supply and small pores faced the electrolyte. The three-phase interface of gas, electrode, and electrolyte occurs substantially at the bi-porous wall.

Although bi-porous electrodes minimize the problem of controlling the reaction interface, it has been found that the fine pore layer in continuous contact with corrosive electrolyte undergoes deterioration, apparent as a result of dissolution of the electrode material. For example, in the use of nickle oxide electrodes and molten potassium hydroxide electrolyte, the oxide coating is dissolved by the electrolyte forming alkali nickelate in solution. In addition to the destruction of the electrode as a result of the dissolution, accumulation of the alkali nickelate in the electrolyte will eventually detrimentally effect the electrical output of the cell, primarily due to dendrite formation and, provided the accumulation is sufficiently concentrated, short out the entire cell. It has been determined that continuous removal of the metal ion formed by the dissolution, by any mechanism, from the close neighborhood of the fine pore layer will speed further dissolution, whereas accumulation of the metal ion will slow down the dissolution.

In order to overcome the problems caused by the dissolution of the fine pore layer, it is proposed according to the present invention to apply an additional layer, facing the electrolyte, over the fine pore layer. It has been found that the third layer effectively retards corrosion of the fine pore layer. Apparently, accumulation of dissolved species from the fine pore layer are retained within the layer by action of the third layer as a convection barrier, retarding further dissolution. Additionally, the third layer can function as an insulator means for the prevention of dendrite formation.

Accordingly, it is the object of the present invention to provide improved fuel cell electrodes comprising a coarse pore layer, a fine pore layer, and a third layer in contact with said fine pore layer.

It is another object of the invention to provide a three-layer electrode comprising a coarse pore layer, a fine pore layer, and a third layer in contact with the fine pore layer, wherein the third layer is composed of the same materials as the fine pore layer.

It is another object of the present invention to provide a three-layer electrode comprising a coarse pore layer, a fine pore layer, and a third layer in contact with said fine pore layer wherein the third layer is constructed from a material substantially more resistant to corrosion than the fine pore layer.

It is still a further object of this invention to provide an improved fuel cell electrode comprising three layers comprising a coarse pore layer, a fine pore layer, and a third layer in contact with the fine pore layer, wherein the third layer has a pore size substantially larger than the pore size of the fine pore layer.

It is another object of the present invention to provide a three-layer electrode for a fuel cell comprising a coarse pore layer, a fine pore layer, and a third layer in contact with said fine pore layer having a pore size substantially the same as that of the fine pore layer with the third layer being constructed of a different material than the fine pore layer.

It is still a further object of the present invention to provide a fuel cell comprising at least one electrode having three layers including a coarse pore layer in contact with the reactant feed, and a fine pore layer in contact with a third layer which in turn is in contact with the electrolyte of the cell.

It is still a further object of the present invention to provide a fuel cell electrode comprising a nickel coarse pore layer, a nickel fine pore layer, and a cerium oxide third pore layer, wherein the pore size is substantially larger than the pore size of the fine pore layer.

It is still a further object of the present invention to provide a fuel cell electrode comprising a nickel coarse pore layer, a nickel fine pore layer, and a rhodium third pore layer.

It is still a further object of the present invention to provide a fuel cell electrode comprising a nickel coarse pore layer, a nickel fine pore layer, and a thorium oxide third pore layer wherein the pores are substantially larger than the pores of the fine pore layer.

These and other objects of the present invention will become more fully apparent from the following detailed description with particular emphasis being placed on the drawing and the illustrative examples.

In accordance with the present invention, the three-layer electrode is constructed from a conventional bi-porous electrode, with the application of a third layer to the surface of the fine pore layer. Thus, the bi-porous electrode can be constructed as described in Francis T. Bacon, U.S. Pat. No. 2,716,670. The main part of the electrode with the large pores, that is to say the part forming the side in contact with the gas, is made by dusting relatively coarse nickel powder having a particle size of about 50 microns into a mold and sintering without compacting, under pressure at a temperature of 1350° C. for approximatey one hour in an atmosphere of nitrogen or hydrogen. The layer with the fine pores is applied to the coarse pore structure by spraying an alcohol suspension of a relatively fine nickel powder having a particle size of about 7 microns. The fine pore layer is caused to adhere to the coarse pore layer by sintering for one hour at a temperature of about 1,000° C. To seal any leaks in the fine pore layer, nickel powder having a particle size of about 7 microns can be rubbed onto the electrode and the electrode re-sintered for one hour at 1,000° C. A conductive lithium-nickel oxide surface is applied by soaking the structure in a solution of lithium hydroxide at room temperature, drying at a temperature of about 125° C. and thereafter oxidizing by heating in air at about 800° C. In the aforesaid manner, a highly conductive and corrosion resistant lithium oxide-nickel oxide system is deposited on the surface of the bi-poorus electrode. The third layer is applied to the fine pore layer by plasma spraying with a powder of a suitable material such as cerium oxide, or by electroplating with a metal such as rhodium. Other methods include spraying the fine pore layer with an alcoholic solution of metal particles such as nickel and thereafter sintering to obtain good adhesion.

The Bacon method of forming a bi-porous electrode described above can be modified as suggested by Goren, U.S. Pat. No. 2,914,596. In the Goren patent, nickel oxide powders, substantially free of impurities, are soaked in a solution of lithium salt such as lithium nitrate, dried, and heated at high temperature to decompose the lithium nitrate providing a residue of lithium oxide dispersed throughout the nickel oxide. The particles of lithiated nickel oxide are prepressed with a binder to the desired geometric shape and sintered.

Bi-porous electrodes for use herein can also be prepared by placing a ring with a lip of proper thickness, usually from about 0.003" to about 0.30" upon a suitable disc, filling said disc with metal alloy powders of select particle size and striking off the excess powder so that a layer of powder, approximately the thickness of the lip, remains. A second ring with a lip, again of a suitable size, is placed over the previously described assembly and select metal powders having a larger particle size than the first layer is carefully sifted into the ring and leveled off at the surface of the second ring. A cap is placed over the assembly and the powders are compacted under pressure and sintered at relatively high temperatures. The resultant electrode is a bi-porous structure.

It is, of course, apparent that the methods previously described of forming the third layer can be employed to modify any bi-porous structure. Additionally, although reference has been made hereinbefore to nickel electrodes, the bi-porous structures can be constructed of any suitable material.

The third or protective layer of the electrode can be constructed from numerous materials including the noble metals which are highly resistant to corrosion, metal oxides, silica, and the like. It has been found that the metal oxides and silica which are highly resistant to corrosion and also insulators can be particularly desirable in certain instances. Thus, provided the material is an insulator, it can be backed up against the fuel cell housing without need of an insulating gasket. In this manner, the third layer can function as an insulator for the electrode and, additionally, prevents dendrite formation. Suitable insulating materials include cerium oxide, thorium oxide, silica, zirconium oxide, and magnesia oxide.

Rhodium has been found to have exceptional properties as the third layer in view of its exceptional resistance to corrosion in alkali electrolytes. When employing rhodium and depositing the material by electrodeposition, it is possible that the rhodium actually forms a distinct third layer. Moreover, it may be that the rhodium selectively replaces the metal at the surface of the electrode, including the internal area of the pores.

As noted hereinbefore, it is only necessary that the third layer act as a convection barrier to retain the metal ion dissolved from the fine pore layer, thereby slowing down further dissolution of the fine pore layer. It is, of course, preferred to employ a material which is relatively resistant to the corrosive influences of the electrolyte.

The pore size of the third layer is also immaterial to a substantial extent. It is possible to construct electrodes wherein the pore size of the third layer is the same size as the fine pore layer, larger than the fine pore layer, or even smaller than the fine pore layer, Additionally, the thickness of the third layer is not critical and can range from a very thin film, as in the case of rhodium applied by deposition, to a relatively thick convection barrier.

Figure 2:
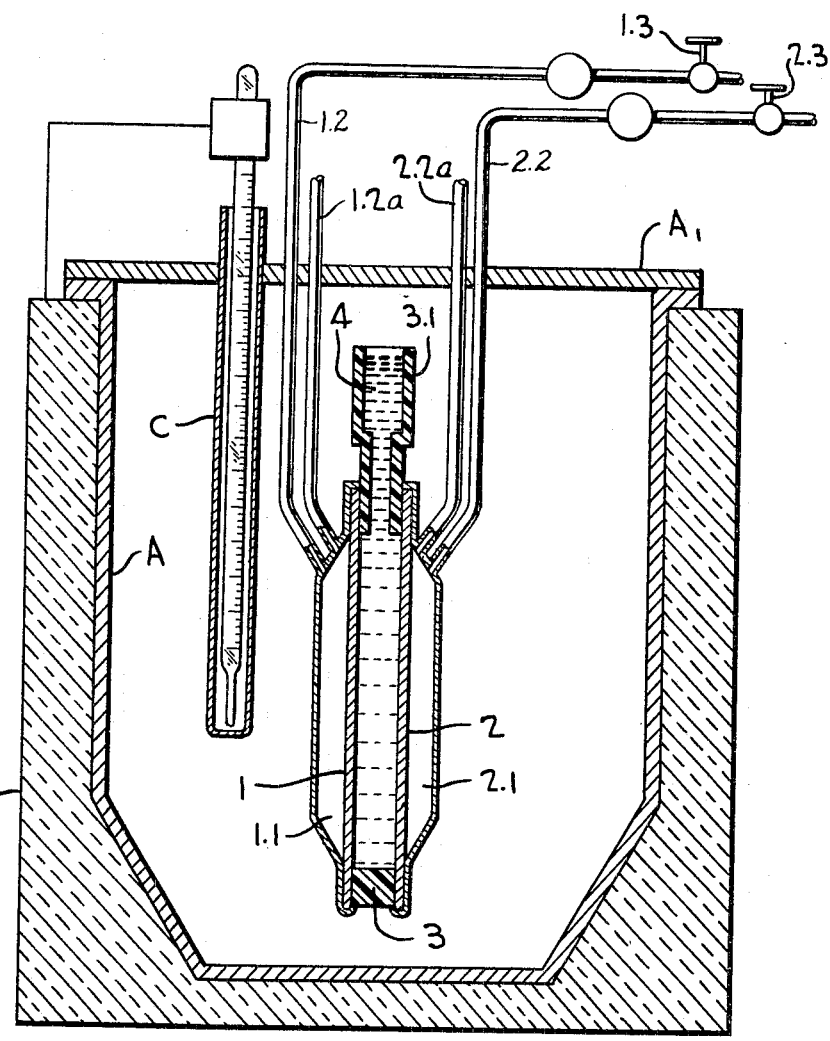

Having described the invention in general terms, more complete embodiments will be set forth in the following examples with particular reference to the illustrative drawing. In the drawing,, FIG. 1 is a cross-sectional view of an electrode constructed according to the present invention and FIG. 2 is a diagrammatic illustration in cross-section of a test cell of the type used in evaluating the electrodes of the present invention.

Example I

A bi-porous lithiated nickel oxide electrode prepared as described in Bacon, U.S. Pat. No. 2,716,670, was plasma sprayed with cerium oxide powder having a particle size of 20 to 60 microns to provide a layer over the fine pore surface having a thickness of 0.005". In FIG. 1 of the drawing, the coarse pore layer 11 has a pore size of from 10 to 50 microns in diameter, fine pore layer 12 has a pore size of 1 to 7 microns in diameter, and protective layer 13 has a pore size of approximately 20 microns in diameter. The electrode having a diameter of 2 inches was run as the cathode in a Bacon-type test cell as shown in FIG. 2 of the drawing, with a similar electrode as the anode. In the drawing, A is a nickel container, B is a heating mantle, C is a nickel thermocouple well with thermometer and sensing device, and $A_1$ is a cover for the nickel container. In the fuel cell proper, 1 is the anode, 2 is the cathode, 1.1 is the fuel compartment and 2.1 is the oxidant compartment with said compartments having inlet means 1.2 and 2.2 and outlet means, 1.2a and 2.2a respectively for feeding the reactants. The electrodes, spaced $3/16$ of an inch apart, are separated from each other by gaskets 3 and 3.1 with gasket 3.1 also serving as a retainer for electrolyte 4. Inlet means for the reactants are controlled by needle valve 1.3 and 2.3. In operation, gaseous oxygen and hydrogen are fed into the respective compartments at a pressure of ten p.s.i.g. The cell employed an 85 percent aqueous KOH electrolyte. At a temperature of 235° C., the cell was maintained under load for 204 hours with an output of 120 to 160 ma./cm.$^2$ at 900 mv. At the end of this period, no dendrites were visible in the electrolyte or on the anode. Moreover, there is no indication of cell deterioration. On the other hand, when an identical cell using similar electrodes, with the exception that they were uncoated, was run under identical conditions for an equal time, large quantities of dendrite were in the electrolyte and on the anode.

Example II

A Bacon-type electrode prepared as described in U.S. Pat. No. 2,716,670 was electroplated prior to preoxidation with rhodium from a solution of rhodium sulfate containing 8 gms./l. rhodium metal. The plating is carried out at a current density of 15 amps/ft.$^2$ and a temperature of 50° C. The anode was platinum. The deposition which is completed in approximately 80 minutes provided a film of 0.005° rhodium on a flat surface. The electrode having a diameter of 2 inches was run as the cathode in a Bacon-type test cell as shown in FIG. II with a similar but not plated electrode as the anode. Hydrogen and oxygen were fed to the test cell at 10 p.s.i.g. The electrolyte was an 85 percent aqueous KOH solution. The cell was operated at a temperature of 235° C. under load for 246 hours with an output of 100 to 180 ma./cm.$^2$ at 900 mv. The dissolution of nickel from under or through the rhodium plating was only 0.025 mg./cm.$^2$/hr. compared to a normal not plated cathode under identical conditions of 0.06 mg./cm.$^2$/hr. The weight loss was determined by weighing the electrodes before and after use. The dendrites in the cell with the plated cathode were less than ½ the usual weight and the oxide accumulation was about 75 percent of the amount usually obtained.

From the above description, it is apparent that the three-layer electrodes, according to the present invention, substantially inhibit the deterioration of the fine pore layer of an electrode and, further, substantially lessens the dendrite formation in the cell.

In the aforesaid examples, it should be appreciated that other electrodes, in addition to the Bacon-type lithiated nickel oxide electrodes, can be employed; and, further the third layer can be composed of other materials such as the metal oxides and noble metals. Additionally, particularly when a noble metal such as rhodium is employed, the rhodium may actually displace a very thin film of the fine pore layer and deposit the rhodium in place thereof. Such electrodes fall within the scope of the present invention.

The novel three-layer electrodes are particularly advantageous in low and medium temperature cells. Thus, the electrodes can be employed in cells operated at temperatures of from about 20 to 250° C. to provide satisfactory current densities. However, since the electrodes are highly stable to heat and corrosion due to the presence of a third layer in contact with the electrolyte, they can be employed in high-temperature cells as well. Thus, fuel cell systems employing the present electrodes can be operated in the temperature range of from about 20 to 950° C. with satisfactory performance.

The electrodes, since they are relatively inert to chemical reaction, can be employed with known prior art electrolytes including acids, aqueous alkaline hydroxides, and carbonate. Virtually any ionic conductor which remains substantially invariant under operating conditions of the cell can be employed. Additionally, the fuels known in the art such as hydrazine, ammonia, and the carbonaceous fuels are operable. The proper choice of the fuel depends primarily on those commercially available and upon the operating temperatures of the cell. The proper selection of the fuel is within the ability of one skilled in the art.

While various modifications of this invention are described, it should be appreciated that the invention is not restricted thereto and the illustrations set forth are not intended to cover all modifications of the invention which will become apparent to one skilled in the art and which fall within the scope of the appended claims.

What is claimed is:

1. An electrochemical cell for the production of electrical energy comprising an anode, a cathode, and an electrolyte, said electrochemical cell being constructed and arranged to provide a chamber between said anode and cathode and said chamber retaining said electrolyte, at least one of said electrodes comprising a metal bi-porous structure having a coarse pore layer and a fine pore layer, the fine pore layer of the bi-porous structure being in contact with a third layer of metal or metal oxide, said metal or metal oxide having a greater inertness to said electrolyte than said fine pore layer and being selected from the group consisting of cerium oxide, thorium oxide, zirconium oxide, magnesia oxide, silica, or rhodium, thereby retarding dissolution of said fine pore layer by retaaining dissolved specie from said fine pore layer within the boundary of said fine pores preventing further dissolution and dendrite formation, said third layer being in direct contact with the electrolyte of the cell.

2. The electrochemical cell of claim 1 wherein the coarse pore layer of the bi-porous structure has a pore size of from about 7 to 100 microns in diameter and the fine pore layer has a pore size of from about 1 to 10 microns in diameter.

3. The electrochemical cell of claim 2 wherein the pore size of the third layer is greater than the pore size of the fine pore layer.

4. The electrochemical cell of claim 2 wherein the coarse pore layer comprises nickel and the fine pore layer comprises lithiated nickel oxide.

5. The electrochemical cell of claim 3 wherein the third layer comprises cerium oxide.

6. The electrochemical cell of claim 3 wherein the third layer comprises thorium oxide.

7. The electrochemical cell of claim 3 wherein the third layer comprises zirconium oxide.

8. The electrochemical cell of claim 3 wherein the third layer comprises magnesium oxide.

9. The electrochemical cell of claim 3 wherein the third layer comprises silica.

10. The electrochemical cell of claim 3 wherein the third layer comprises rhodium.

11. The electrochemical cell of claim 5 wherein the third layer has a pore size of approximately 20 microns.

References Cited

UNITED STATES PATENTS

| | | | |
|---|---|---|---|
| 2,947,797 | 8/1960 | Justi et al. | 136—120 |
| 3,116,170 | 12/1963 | Williams et al. | 136—86 |
| 3,222,224 | 12/1965 | Williams et al. | 136—120 |
| 3,226,263 | 12/1965 | Oswin | 136—120 |
| 3,300,343 | 1/1967 | Huber et al. | 136—120 |

WINSTON A. DOUGLAS, Primary Examiner

H. A. FEELEY, Assistant Examiner

U.S. Cl. X.R.

136—120